United States Patent [19]

Dixon et al.

[11] Patent Number: 4,506,880
[45] Date of Patent: Mar. 26, 1985

[54] SHEET HANDLING MACHINES

[75] Inventors: Christopher J. Dixon, Buckhamshire; Stuart M. Jenkins, Sussex, both of England

[73] Assignee: De La Rue Systems Limited, London, England

[21] Appl. No.: 509,463
[22] PCT Filed: Dec. 8, 1981
[86] PCT No.: PCT/GB81/00264
    § 371 Date: Aug. 6, 1982
    § 102(e) Date: Aug. 6, 1982
[87] PCT Pub. No.: WO82/02037
    PCT Pub. Date: Jun. 24, 1982

[30] Foreign Application Priority Data
    Dec. 8, 1980 [GB] United Kingdom ............. 8039232

[51] Int. Cl.³ ............................................. B65H 7/12
[52] U.S. Cl. ................................................. 271/263
[58] Field of Search ............... 271/263, 258, 259, 262

[56] References Cited
U.S. PATENT DOCUMENTS

| 3,077,983 | 2/1963 | Middleditch | 271/263 X |
| 4,073,488 | 2/1978 | Uchida | 271/106 X |
| 4,095,781 | 6/1978 | Kistner | 271/263 X |
| 4,154,437 | 5/1979 | Butcheck | 271/263 X |
| 4,420,747 | 12/1983 | Kistner | 271/263 X |

Primary Examiner—Richard A. Schacher
Attorney, Agent, or Firm—Sughrue, Mion, Zinn, Macpeak and Seas

[57] ABSTRACT

A machine for detecting the passage of two or more superimposed banknotes comprises: first (101) and second (102) parallel rotatable shafts mounted between fixed side frame members (103, 104); two pairs of resilient plastics rollers (105 to 108) on each rotatable shaft, the rollers mating to form nips for engaging a banknote; a first plate (112) mounted by means of a bearing (115) on the first shaft (101) for conveying the movement of the shaft to the body (113) of a linear variable differential transformer; a second plate (117) similarly mounted on the second shaft (102) for conveying the movement of the second shaft to an armature (118) of the transformer; and a control circuit responsive to a signal from the transformer (114) for determining the relative deflection of the shafts at their mid points due to the passage of a banknote through one group (105, 107) of cooperating pairs of rollers. The control circuit indicates the presence or absence of single or multiple banknotes.

10 Claims, 4 Drawing Figures

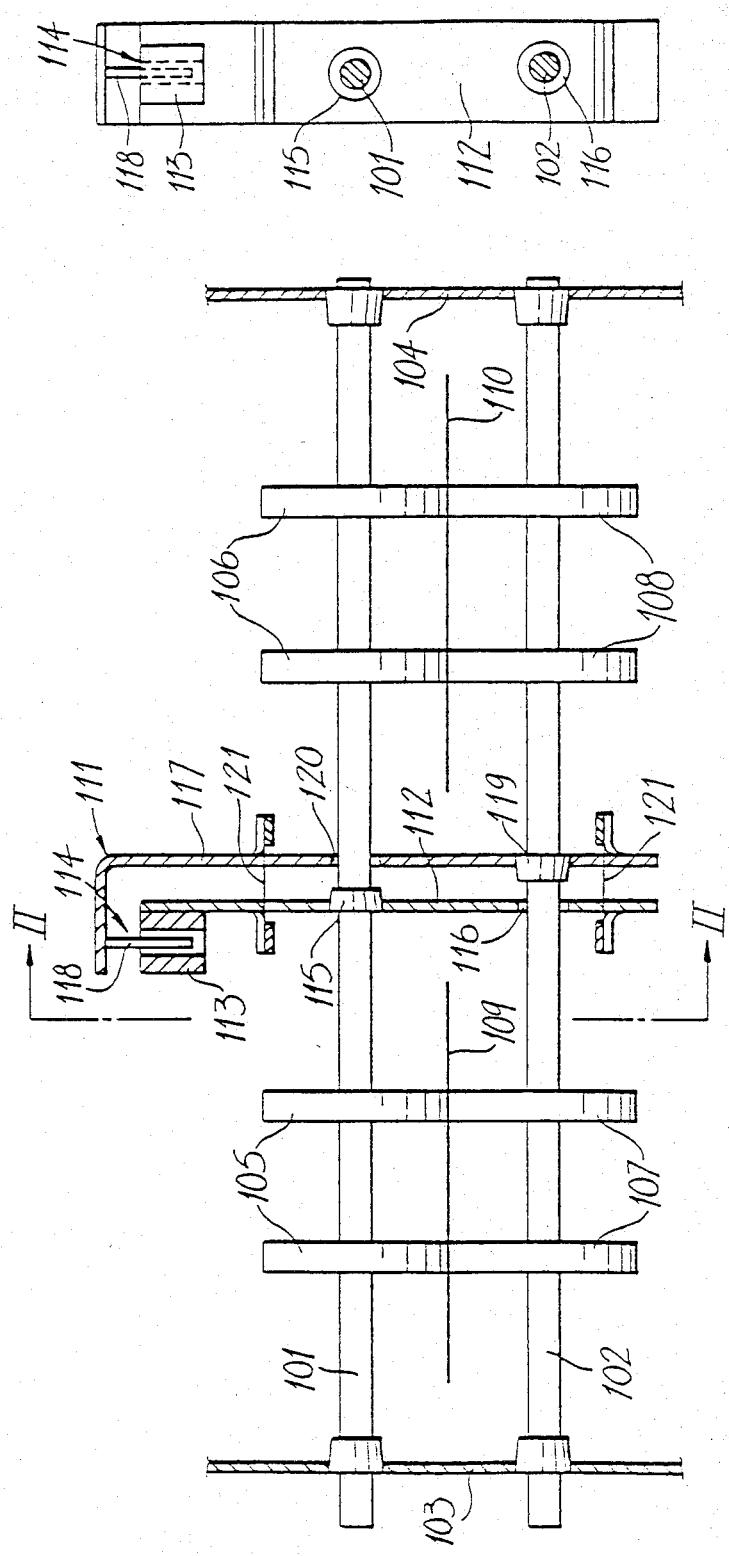

SHEET HANDLING MACHINES

This invention relates to machines for the high speed handling of sheets and more particularly to a banknote handling machine incorporating an apparatus for detecting the thickness of two or more superimposed banknotes passing through the machine.

Mechanical thickness detectors are known using a roller whose axis is displaced by the passage of a banknote or banknotes to cause an electrical contact to be made or broken if the displacement is such as to indicate the passage for superimposed banknotes.

These detectors have the disadvantage that the shafts which carry the banknote feed rollers are deflected by the passage of multiple notes which causes instability of the feeding assembly within the machine main frame resulting in incorrect thickness detection.

In the applicant's co-pending application No. PCT/GB81/00237 there is disclosed apparatus for detecting single or multiple sheets comprising: a surface on which the sheet or sheets is supported for movement in the plane of the sheets; a follower biased such that it normally abuts against the support and follows the profile of the surface of the support and the overlying sheet or sheets; a transducer responsive to the position of the follower to provide a thickness signal indicative of the linear displacement of the follower relative to the support due to the passage of the sheet or sheets; and a control circuit which compares the thickness signal with at least one stored threshold level signal to provide an output signal indicative of whether the detected thickness corresponds to that of a single sheet or multiple sheets; and characterized in that the control circuit includes means for repeatedly updating the or each stored threshold level signal from the thickness signal provided when there is no sheet between the support and the follower.

In some adverse conditions, a support frame for the transducer, the follower arm and the support surface was subject to warping, resulting in unsatisfactory performance.

An aim of the present invention is to provide an improved machine for detecting single or multiple sheets which is less sensitive to external influences. The invention consists in a sheet handling machine comprising: first and second parallel rotatable shafts mounted between fixed side frame members; first and second rollers carried by the first and second rotatable shafts respectively, the rollers mating to form a nip therebetween; the sheet thickness detecting apparatus comprising a transducer having first and second relatively movable parts, the relative movement of which results in a transducer output signal, the first and second parts being so mounted in the apparatus that the passage of a sheet between the rollers results in a signal indicative of sheet thickness, and a control circuit which compares the thickness signal with at least one stored threshold level signal to provide an output signal indicating whether the detected thickness corresponds to a single sheet or multiple sheets; characterized in that the first and second parts of the transducer are mounted on middle portions of the first and second rotatable shafts respectively, whereby the relative motion of the rotatable shafts is conveyed directly to the transducer.

Preferably, the transducer is mounted on the shaft by two plates, a first plate carrying the first part of the transducer at one end and being supported through a bearing by the first shaft, the first plate having an aperture through which the second shaft passes with a clearance, and a second plate carrying the second part of the transducer and being supported through a bearing by the second shaft, the second plate having an aperture through which the first shaft passes with a clearance.

In the preferred embodiment, the said two plates are joined by resilient means which allow a degree of movement between the plates in one direction only. Conveniently, the resilient means in a spring strip; alternatively the resilient means may taken the form of a rubber strip.

The transducer is conveniently a linear variable differential transformer (L.V.D.T.).

The machine preferably has nip rollers at each end of the rotatable shafts, at opposite sides of the sheet thickness detecting apparatus and a sheet is fed alternatively into the nip rollers at either side. In a preferred construction the machine has two pairs of rollers on the first shaft which mate with two pairs of rollers on the second shaft, the pairs of rollers being located at opposite sides of the said two plates supporting the thickness detecting apparatus.

A preferred embodiment of the invention will now be described by way of example, with reference to the accompanying drawings, in which:

FIG. 1 is a diagrammatic elevation of a pick-up roller assembly with a banknote thickness detecting apparatus arranged between mating pairs of rollers at the mid-portion of the shaft;

FIG. 2 is a vertical section taken along the line II—II of FIG. 1; and

Figure 3A:
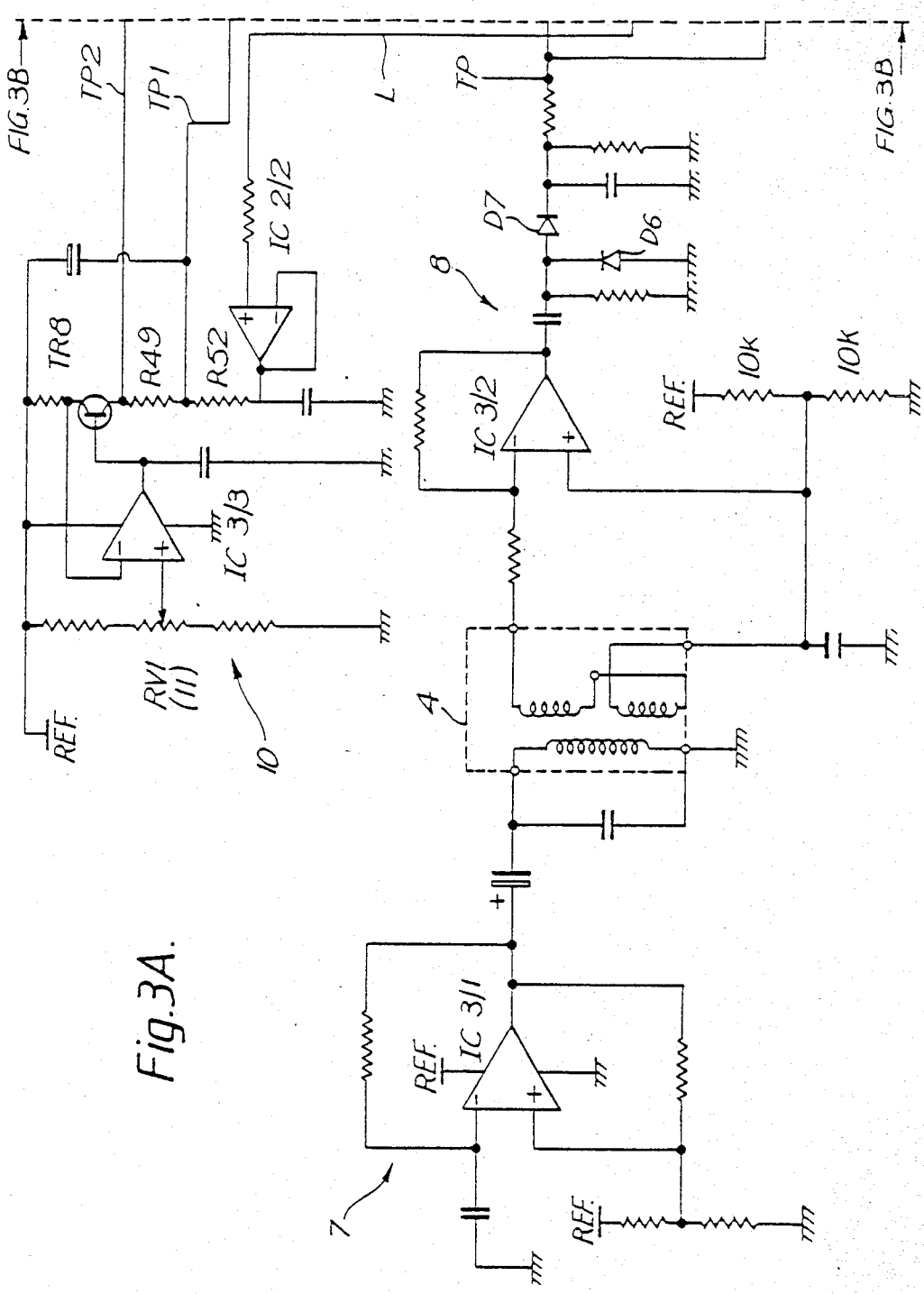
FIGS. 3A and 3B are two halves of a circuit diagram of the control circuit for processing the thickness signal to determine the presence or absence of single or multiple sheets.

Referring now to the drawings in detail, the machine comprises two shafts 101 and 102, the first shaft 101 being rotatably mounted between two fixed side frame members 103 and 104 and carrying two pairs of pick-up rollers 105 and 106 made of resilient urethane plastics material.

The second shaft 102 is similarly rotatably mounted between the two frame members 103 and 104 and carries two pairs of D-shaped pick-up rollers 107 and 108. These D-shaped rollers are also made of resilient urethane and due to their shape mate with the pick-up rollers 105 and 106 to provide a curl to the leading edge of two banknotes 109 and 110 as they pass them to the feed path of the machine.

As banknotes pass into the nip of the pick-up rollers they cause a deflection of the shafts away from each other which is particularly pronounced at the midpoints of the two shafts.

When multiple superimposed notes are fed through the pick-up roller there is a greater deflection of the shafts 101 and 102 relative to each other. This deflection can be utilised by a thickness detecting apparatus to indicate whether a single banknote or multiple banknotes are being fed through the pick-up roller assembly and the multiple fed banknotes can be diverted or the passage of these banknotes can be recorded for analysis on a U.V. paper recorder.

In the illustrated embodiment a thickness detecting apparatus is generally indicated at 111 and comprises a first rigid metal plate 112 at the upper end of which is fixed the body 113 of a linear transducer in the form of a linear variable differential transformer 114

(L.V.D.T.). This plate has a spiraline bearing 115 for mounting the plate to the shaft 101 and an aperture 116 to allow the passage with a clearance of the shaft 102.

A second rigid metal plate 117 has mounted at its upper end an armature 118 of the L.V.D.T. 114 which locates in the transformer body. This plate 117 has a spiraline bearing 119 for mounting the plate to the shaft 102 and has an aperture 120 for allowing the passage, with a clearance, of the shaft 101. The two plates 112 and 117 are connected by two spring strips 121 which are bolted to the plates and allow movement of the two plates in one direction only, i.e. in the vertical direction.

The spring strips may be replaced by rubber strips so as to allow movement of the plates in the vertical direction i.e. in the plane of the plates and to provide a damping force.

Banknotes are fed into the nip of the rollers at the right hand side or left hand side of the apparatus 111; a feed mechanism (not shown) can cause successive banknotes to alternate between the two sides.

Although the resilient urethane pick-up rollers absorb some of the shaft deflection there is an appreciable deflection of the shafts as a banknote passes through the rollers. This shaft deflection will generate sufficient output from the L.V.D.T. to enable differentiation to be made between:

(a) No banknote being present
(b) One banknote being present
(c) Two banknotes being present The L.V.D.T. output is fed to a control circuit with a self-adjusting reference voltage which compares the thickness signal with at least one stored threshold level signal to provide an output signal indicative of whether the detected thickness corresponds to a single banknote or multiple superimposed banknotes.

The L.V.D.T. output can be handled using either analogue or digital techniques, and an analogue technique will now be described with reference to FIGS. 3A and 3B. This circuit stores a self-regulating threshold voltage and compares the current thickness signal with thresholds to determine whether it represents one or more banknote thicknesses.

The L.V.D.T.4 (114 in FIG. 1) is driven by a primary drive oscillator IC3/1 which runs at about 10 kHz. The whole oscillator circuit 7 supplies an output through an electrolytic capacitor to the drive coil of the L.V.D.T.4. (Throughout FIGS. 3A and 3B, the symbol "REF" indicates a connection to a reference voltage source of 0.5 volts, being the same level as the output TP3 for no note present between the rollers.) The L.V.D.T. sensor output, i.e. the thickness signal, is amplified about five times by amplifier IC3/2, and reaches diode D7 via a high pass filter, which allows only the carrier content of the signal to pass through. Diode D6 provides D.C. restoration to gain full advantage of the envelope.

The signal emerging from diode D7 is labelled TP. The lowest level of signal TP is nominally at 0.5 volt, the reference level for TP3. The single- and double-note thresholds for the signal TP are referred to as TP1 and TP2.

The output signal TP from the level detector 8 is fed to the auto reference circuit 9, which is connected to circuitry 12, 13 for determining the presence of a single or a double note. Signal TP is fed to an amplifier IC/1 whose output normally follows the TP signal. When a note appears, a transistor TR6 connected between the output of IC2/1 and the reference level, is switched off by a single note comparator 12 (IC/3) connected to the base of transistor TR6. This prevents the output of IC2/1 from following the level of the output signal TP while a note is present.

The output level of IC2/1 is maintained by an electrolytic capacitor C13, connected between the output of IC2/1 and ground. This level is maintained by the capacitor C13 until the note has passed. A resistor network consisting of resistors R48, R50 and R51 ensures that the capacitor C13 always attempts to charge towards the optimum quiescent point to prevent any possible locking out of the system. The output level from amplifier IC2/1 is also conveyed along line L to an input of another amplifier IC/2, shown in the upper half of FIG. 3A. This part of the circuit is responsible for obtaining reference levels TP1 and TP2 from the reference defined by the potential stored in capacitor C13. The reference levels for single and double notes are derived from the reference level for when no note is present. The purpose of this part of the circuit is to maintain the difference between the reference levels TP1, and TP2 and TP3 despite any variations in the reference level TP3, the difference being determined by a thickness control circuit 10 comprising a variable resistor RV1. An amplifier IC3/3 and a transistor TR8 are connected between the reference potential and ground so as to constitute a constant current source. The current output of this constant current source is determined by the value of the variable resistor RV1 (11), in accordance with the desired threshold thickness level. Reference resistors R49 and R52 are connected in series between the collector of transistor TR8 and the output of the amplifier IC/2. The reference resistor R52 and R49 are fed by the constant current source TR8, IC3/3 and the resistors together with the constant current source from a transconductance amplifier. The current passing through the reference resistors sets up the two reference thresholds TP1 and TP2 for single notes and double notes respectively. The reference voltages are fixed above the output of amplifier IC/2 which is effectively the TP3 "no note" level. Any change in the reference level for no note, TP3, therefore causes the reference levels TP1 and TP2 to change by the same amount, thus retaining the reference differentials. The references for single and double thicknesses of notes are therefore always made with reference to the current quiescent displacement of the core of the L.V.D.T. sensor 4.

Figure 3B:
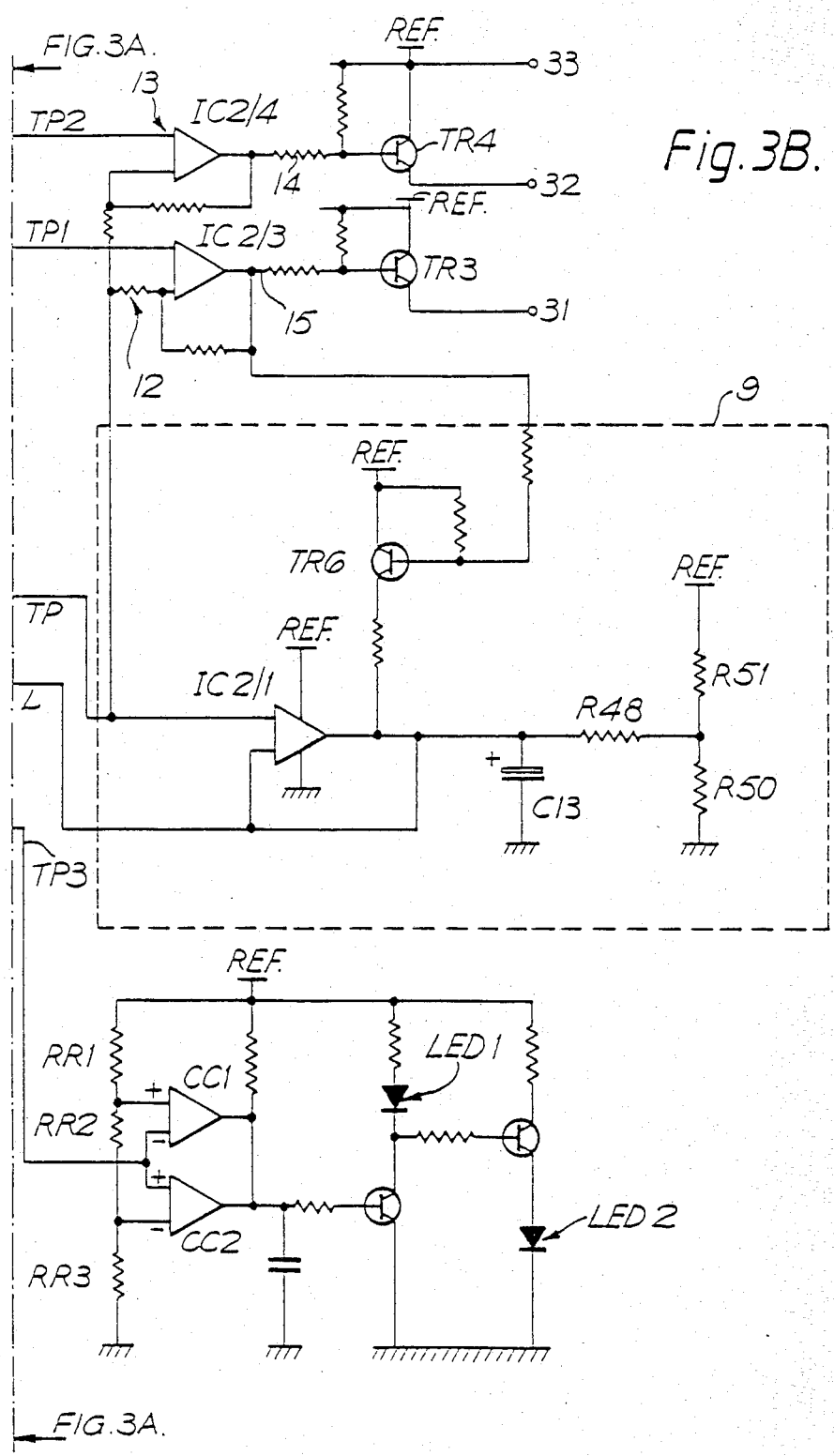

The reference voltage TP1 and TP2 are conveyed to difference amplifiers IC2/3 and IC2/4 respectively, as shown in FIG. 3B. Amplifiers IC2/3 and IC2/4 together with their respective feedback resistors constitute output comparators for single and double notes respectively, designated 12 and 13 in FIG. 3B. The other input to the comparators in each case is the current value of the output TP from the level detector 8. The outputs 15, 14 of the output comparators 12, 13 are fed to transistors TR3 and TR4, the emitter of each transistor being connected to the reference potential. Transistors TR3 and TR4 are normally-saturated switches. Transistor TR3 turns off when a single note is present, and TR4 turns off when a double note is present. These transistors provide outputs at points 31, 32 and 33 to further circuitry (not shown) which may respond to the presence or absence of single or double notes.

In the circuit shown in FIG. 3A, reference resistors R49 and R52 need not have the same value, thus allowing the differentials between the threshold potential values to be different. The difference between TR2 and TR3 need not be exactly double that between TP1 and TP3.

The control circuit described above responds to the presence of single or double banknote thicknesses, but could be extended to respond to multiple banknote thicknesses, or to the thicknesses of different types of banknotes. The detector could for example discriminate between a thick note and a thin note and/or between double thickness of each type of note.

We claim:

1. A sheet handling machine comprising: first (101) and second (102) parallel rotatable shafts mounted between fixed sided frame members (103, 104); first (105) and second (107) rollers carried by the first and second rotatable shafts respectively, the rollers mating to form a nip therebetween; sheet thickness detecting apparatus comprising a transducer (114, FIG. 1; 4, FIG. 3A) having first (113) and second (118) relatively movable parts, the relative movement of which results in a transducer output signal, the first and second parts being so mounted in the apparatus that the passage of a sheet between the rollers results in a signal indicative of sheet thickness, and a control circuit (FIG. 3A, FIG. 3B) which compares the thickness signal with at least one stored threshold level signal (TP1, TP2) to provide an output signal (31, 32, 33) indicating whether the detected thickness corresponds to a single sheet or multiple sheets (109); wherein each of the first and second shafts is flexible and thus deflectable by the passage of sheets between the rollers, and wherein the first and second parts of the transducer are mounted on middle portions of the first and second rotatable shafts respectively, whereby the relative motion of the rotatable shafts is conveyed directly to the transducer.

2. A machine in accordance with claim 1, wherein the first and second rollers constitute nip rollers at one side of the sheet thickness detecting apparatus, and further including similar nip rollers (106, 108) at the opposite side, a sheet being fed alternatively into the nip rollers at either side.

3. A machine in accordance with claims 1 or 2, wherein the transducer (114) is mounted on the shafts by two plates, a first plate (112) carrying the first part of the transducer at one end and being supported through a bearing (115) by the first shaft (101), the first plate (112) having an aperture (116) through which the second shaft passes with a clearance, and a second plate (117) carrying the second part (118) of the transducer and being supported through a bearing (119) by the second shaft (102), the second plate (117) having an aperture (120) through which the first shaft passes with a clearance.

4. A machine in accordance with claim 3, wherein the two plates (112, 117) are joined by resilient means (121) which allow a degree of movement between the plates in one direction only.

5. A machine in accordance with claim 4, wherein the resilient means is a spring strip (121).

6. A machine in accordance with claim 4, wherein the resilient means is a rubber strip which additionally provides a damping force.

7. A machine in accordance with claims 1 or 2, wherein the transducer is a linear variable differential transformer, whose first part is a transformer body (113) and whose second part is an armature core (118).

8. A machine in accordance with claims 1 or 2, wherein each shaft carries a pair of rollers for engaging a single sheet, the rollers on one shaft mating with corresponding rollers on the other shaft.

9. A machine in accordance with claim 8, wherein each shaft comprises two pairs of rollers arranged on opposite sides of the middle portion of the shaft, the machine then providing two distinct alternative paths for a sheet.

10. A machine in accordance with claims 1 or 2, wherein the rollers are of a resilient plastics material.

* * * * *